June 4, 1974

W. D. WOLF 3,814,784

FORMING DEEP ARTICLES HAVING RELATIVELY
BALANCED MOLECULAR ORIENTATION

Filed June 5, 1972

INVENTOR.
WILLIAM D. WOLF

BY Michael J. Murphy
ATTORNEY

INVENTOR.
WILLIAM D. WOLF

United States Patent Office 3,814,784
Patented June 4, 1974

3,814,784
FORMING DEEP ARTICLES HAVING RELATIVELY BALANCED MOLECULAR ORIENTATION
William D. Wolf, Simsbury, Conn., assignor to Monsanto Company, St. Louis, Mo.
Continuation-in-part of abandoned application Ser. No. 113,577, Feb. 8, 1971. This application June 5, 1972, Ser. No. 259,793
The portion of the term of the patent subsequent to June 5, 1990, has been disclaimed
Int. Cl. B29c 17/04
U.S. Cl. 264—89
9 Claims

ABSTRACT OF THE DISCLOSURE

A method of forming articles having relatively balanced molecular orientation from substantially amorphous thermoplastic sheet material. The sheet material is forced by means of a plug in an axial direction while at a temperature within a range at which rubbery flow of the thermoplastic occurs to partially form the article while developing a limited amount of orientation in the axial direction. The thus forced material is held in contact with a temperature conditioned surface to reduce its temperature to one which is above the glass transition temperature of the material and is within a range whereat the ratio of modulus to temperature is greater than 1 in a plot of modulus of the material versus temperature. Then the material is expanded outwardly against the walls of a mold cavity while within said latter temperature range to develop radial orientation and finish form the article.

BACKGROUND OF THE INVENTION

This application is a continuation-in-part of copending application Ser. No. 113,577, filed Feb. 8, 1971, now abandoned.

The present invention relates to a method of forming hollow articles such as containers from substantially amorphous thermoplastic sheet material, and more particularly to a plug assist method of forming such articles having a relatively balanced amount of molecular orientation developed therein.

It is well known to form articles such as containers from sheet material by initially forcing the heat softened sheet with a plug into a die cavity and then expanding the sheet outwardly off the plug into contact with the surface of the cavity to finish form the article. As is also known, forming from sheet material is not the only method of making plastic articles. Other techniques involve injection molding the plastic either directly into finished article form or blow molding an injection molded preform into the shape of the finished article. Yet another way involves extruding a tubular preform and then expanding it within a blow mold to finish form the article.

It is likewise well known that when many substantially amorphous thermoplastic materials such as, for example, polymers and copolymers based on styrene, vinyl chloride and acrylic monomers as well as nitrile-group-containing monomers are stretched at a temperature sufficiently low such that the material will retain stresses generated therein as a result of the stretching, that the molecules of the plastic become oriented in the direction of stretch to an extent which, within limits, is proportional to the amount of stretch. The thus stretched material has considerably greater strength and toughness than previously. However, if stretching occurs only or predominantly in a single direction, the material is relatively weak in a direction transverse to the direction of stretch. Accordingly, when containers are formed by stretching such plastics predominantly in the axial direction, it has been found that they will split or fiber when squeezed transverse to the axial direction. In cases where it is possible to work the material during forming by multi-directional stretching to an extent which is relatively uniform in each direction, more nearly uniform strength all directions accordingly would be expected to be obtained.

Control of the degree of orientation in the axial and radial directions may be achieved by various means in straight blow molding or injection-blow processes. An axially oriented tubular preform is shaped in either case at a relatively high temperature whereat the plastic is in a rather relaxed condition and has a marked component of flow. This tubular shape of the preform in these systems is basically that of the finished article when the latter is a container such as a bottle or a can, and only final expansion of the preform is required to finish form the article. By regulating the length of the parison or preform with respect to the height of the finished article, or with respect to the height of the mold cavity which defines the article during final expansion, the amount of orientation in the axial direction with respect to that in the transverse or radial direction can be fairly accurately controlled.

However, injection and extrusion blow molding tech niques have some serious disadvantages when compared with the technique of thermoforming from sheet material. More specifically, injection molding requires the generation of unusually high pressures and consequently temperatures in order to force the thermoplastic into relatively narrow cavities which are exactly equivalent to or approach the wall thickness of the finished article. This in turn requires heavy equipment and the processing conditions may be too severe to accommodate certain heat sensitive materials, or alternatively such materials may be too stiff in flow at acceptable processing conditions to force into such confined spaces. With straight extrusion-blow molding (as well as injection molding) output is limited to the extent that only one or two articles may be simultaneously formed from a parison portion, whereas a great many articles, e.g. up to 50, may be formed from sheet material in an approximately equivalent time when a suitable number of cavities are provided. Since the sheet need only be sufficiently pliable to permit forcing it through the open mouth of a die cavity, the severe processing conditions and heavy equipment inherent in an injection molding system are avoided. However, to form a deep article such as a bottle or can from sheet material which has relatively balanced molecular orientation therein has heretofore been a problem. This was so because, unlike blow and injection molding techniques, a preform must be shaped from a flat planar sheet by forcing the latter a substantial distance into the die cavity such that the amount or orientation in the axial direction in the finished article was always substantially greater than that in the other direction. This of course acts as a detriment when the container is to be used, for example, to contain pressurized materials where high strength in all directions is required.

SUMMARY OF THE INVENTION

Now, however, there has been discovered a novel technique for shaping relatively deep articles from orientable sheet material which have much more balanced molecular orientation therein than that attainable according to prior art techniques.

Accordingly, it is an object of this invention to provide a modified and improved plug assist method of forming deep articles from substantially amorphous thermoplastic sheet material.

Another object of this invention is to provide a method of forming tubular, relatively thin wall containers from substantially amorphous thermoplastic sheet material which have high strength both longitudinally and transversely.

A further object of this invention is to provide a thermoforming process for shaping a deep container of improved strength capable of withstanding internal pressure and relatively rough handling without fracturing.

Another object of this invention is to provide a method of balancing the amount of molecular orientation developed in substantially amorphous thermoplastic sheet during forming of deep hollow articles therefrom.

A further object of this invention is to provide a novel combination of temperature dependent molding steps in a plug assist process of forming from substantially amorphous thermoplastic sheet material to affect an improvement in the strength properties of the finished article.

An additional object of this invention is to provide a plug assist thermoforming process for shaping articles having a substantially improved balance of axial and circumferential molecular orientation utilizing conventional apparatus components requiring little or no revision.

Other objects of this invention will in part be obvious and will in part appear hereinafter.

These and other objects are accomplished in a plug assist thermoforming process for forming a deep hollow article from substantially amorphous thermoplastic material which involves expanding a portion of the thermoplastic outwardly off the plug against the surface of a mold cavity by providing the improvement which comprises forcing the thermoplastic in an axial direction while at a temperature at which rubbery flow of the thermoplastic material occurs to partially form the article while minimizing development of orientation in said axial direction and then holding said sheet portion in contact with a temperature conditioned surface prior to expanding it outwardly against the surface of the mold cavity to reduce the temperature of said material to within the range whereat the ratio of modulus to temperature is greater than 1 in a plot of the modulus of the material versus temperature. In this way, the relatively long stretch of the sheet in the axial direction is carried out at a temperature somewhat higher than that of the sheet during the shorter stretch in the radial direction in reaching the cavity walls, this latter movement at the lower material temperature thereby providing an overall improvement in the balance between axial and circumferential or radial orientation in the finished article.

BRIEF DESCRIPTION OF THE DRAWINGS

In describing the overall invention, reference will be made to the accompanying drawings wherein.

DETAILED DESCRIPTION OF THE INVENTION

Figure 1:
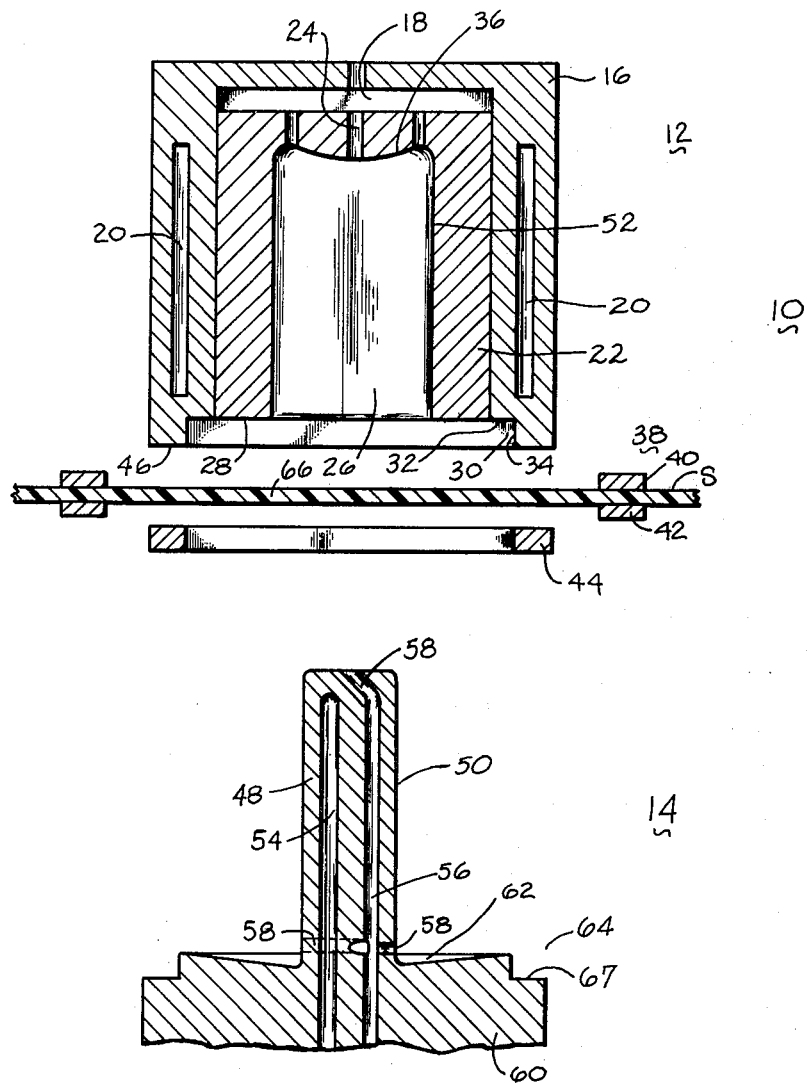
FIGS. 1-5 are partial, sectional views of apparatus components used in the present invention illustrating the position of the sheet during successive steps in the overall process.

Referring now to the drawings, there is shown in FIG. 1, a thermoforming assembly 10 capable of forming relatively deep articles such as containers in the form of cans, from substantially amorphous thermoplastic sheet material S. For purposes of this invention, a major proportion of the thermoplastic material must be in the amorphous state, though a measurable amount of crystallinity can be present to a lesser extent. The respective levels of crystalline and amorphous phases may be determined by X-ray spectral analysis at room temperature (73° F.) by comparing the area under the spectral curve for the amorphous versus crystalline phases. The amorphous peak is represented by a broad low intensity scattering whereas the crystalline peak occurs with a high intensity and over a very narrow range as defined by the Bragg equation $n\eta = 2d \sin \varphi$ where $n=$ No. of reflections, $\eta=$ wave length of the X-rays, $d=$ distance between planes and $\varphi=$ angle of viewing. Where the area under the peak for the amorphous phase is more than 50% of the total area, the polymer is considered to be substantially amorphous.

Figure 6:
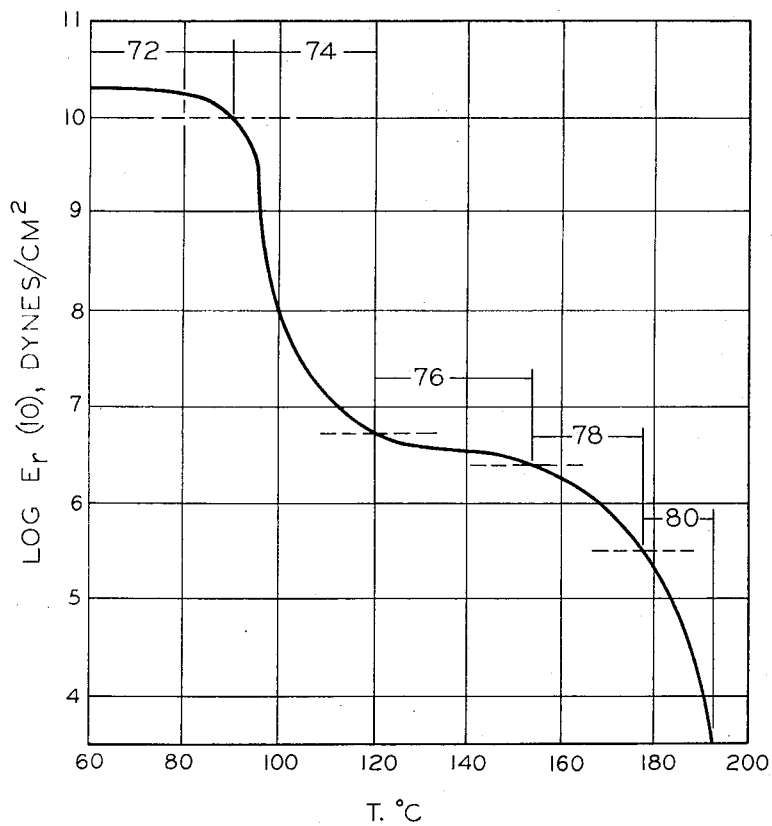
FIG. 6 is a graph of relaxation modulus versus temperature for a typical amorphous thermoplastic material.

The viscoelastic behavior of a substantially amorphous thermoplastic polymer is illustrated in FIG. 6. Though the illustrated curve is for atactic polystyrene having a number-average molecular weight $\overline{M}_n$ of 217,000, the shape of the curve is typical for all substantially amorphous thermoplastic polymers. $E_r$ on the ordinate of FIG. 6 represents the relaxation modulus obtained by measuring stress versus temperature at a given time (10 sec. in FIG. 6) in a sample maintained at a fixed stretch length. The illustrated curve depicts five regions of viscoelastic behavior. The first region illustrated as 72 is the so called glassy region where the polymer is truly hard and brittle. The second region illustrated as 74 commences at the glass transition temperature $T_g$ (90° C. in FIG. 6) and is known as the transition region where the modulus changes rapidly and the ratio of modulus to temperature for the region is greater than one (1). For purposes of the present invention, the temperature range within the transition region (90 to 120° C. for the specific sample on which FIG. 6 is based) is considered to be that at which substantial molecular orientation occurs on stretching. The third region 76 where the modulus remains fairly constant with temperature is known as the rubbery plateau and the behavior of the polymer is truly rubbery in this interval. In the fourth region 78, the polymer is elastic and rubbery, but also has a marked component of flow. For purposes of the present invention, when the polymer temperature is within the interval encompassed by the third and fourth regions 76 and 78 whereat it has a rubbery flow component, some but not substantial molecular orientation occurs on stretching as can be observed by noting the relative position of $E_r$ for these regions versus the increased value of $E_r$ for region 74 and the decreased value thereof for region 80. In the fifth region 80, the polymer exhibits little or no elastic recovery and manifests an apparent state of liquid flow. When the polymer is substantially crystalline in nature, the rate of change of the modulus with temperature is quite sharp in the temperature ranges within which orientation can be generated, and consequently the differential in orientation with temperature, which is of primary concern in the present invention, is much more difficult to take advantage of, the modulus $E_r$ being proportional to the amount of molecular orientation in the material.

Returning now to FIG. 1, thermoforming assembly 10 includes a mold assembly 12 and a plug assembly 14. Mold assembly 12 comprises mold adapter block 16 having passages 20 formed therein which are conventionally connected by conduit means (not shown) to a source of cooling medium supply utilized to set the plastic after forming the article by circulation through passages 20. Mold assembly 12 further comprises mold 22 suitably fastened in adapter block 16 by conventional means (not shown). Mold 22 has a series of channels 24 formed therein opening at one end into cavity 26 and communicating at the other end with passage 18 formed between the base of mold 22 and the opposing wall of block 16. Passage 18 is connected conventionally to a source of pressurized fluid such as air (not shown) and may be connected as well to the atmosphere or to a source of reduced pressure by suitable conventional valving. Adapter block 16 adjacent rim 28 of mold 22 has a step 30 formed therein which includes horizontal portion 32 and vertical portion 34. The walls 52 defining the sides of cavity 26 of mold 22 extend vertically from base 36, though it should be understood that they may diverge outwardly if desired.

Supporting frame 38 is provided between mold assembly 12 and plug assembly 14 and comprises a pair of upper and lower opposed cooperating jaws 40 and 42, respectively. Clamping ring 44 is provided adjacent supporting frame 38 which is in vertical alignment opposite surface 46 of adapter block 16.

Plug assembly 14 includes plug 48 which has an axially extending surface 50 which is parallel to the sidewalls 52 of mold 22. Should cavity sidewalls 52 be sloped, then surface 50 could likewise be sloped in the same direction but could be straight depending on the amount of orientation desired to be selectively generated in a particular portion of the article in the manner to be hereafter described in more detail. Plug 48 has a cavity 54 formed therein for accommodating conventional means, such as a cartridge resistance heater (not shown), for maintaining surface 50 at a predetermined temperature. It should be understood that alternative means may be employed for controlling the temperature of surface 50, for example, passages through which a suitable heat exchange fluid is circulated. Also formed within plug 48 is a passage 56 having a series of branches 58, each of which opens at one end onto surface 50 of plug 48. Passage 56 is connected to both a source of reduced pressure and to a source of super atmospheric pressure by means of conventional valve means not shown and well known to those skilled in the art. Plug assembly 14 further comprises a base portion 60 having a shallow recess 62 formed therein adjacent the lower or trailing end of plug 48. It may be necessary to form those branches 58 at the trailing end of plug 48 in the surface defining recess 62 to avoid an air pocket which might otherwise occur during use when such branches are above the pocket. Shoulder 64 is provided about the periphery of base 60, surface 67 thereof being vertically aligned opposite clamping ring 44.

In operation, a sheet S of substantially amorphous, molecularly orientable thermoplastic in a generally molecularly unoriented condition is supported about its periphery between jaws 40 and 42 of supporting frame 38 opposite the mouth of mold cavity 26. Sheet S, and necessarily the portion 66 thereof within the supported periphery, at this stage of the process is at a preselected temperature which generally requires that sheet S be heated, for example by conventional means such as an infra-red heater, not shown, but it may require cooling, for example when the sheet has just issued from an extrusion die, such cooling also being accomplished by conventional means, for example by passing the sheet through a conventional roll type sheet tempering apparatus (not shown). Broadly speaking the upper limit of the temperature of the sheet at this point in the process for substantially amorphous molecularly orientable thermoplastics should always be below the conventional extrusion or melt working temperature of the thermoplastic and generally 10 to 100° F. above the temperature at which substantial molecular orientation occurs, the latter to be described more completely hereafter. More specifically, with reference to FIG. 6, the temperature of the thermoplastic should be within regions 76 and 78 where the thermoplastic material has a rubbery component of flow when stretched.

In the apparatus embodiment of the drawings, clamping ring 44 is now moved by suitable conventional means into and against the sheet adjacent the supported periphery to force a circumferentially extending band of portion 66 inwardly of jaws 40 and 42 against surface 46 of adapter block 16 adjacent the mouth of mold cavity 26. Alternatively, this particular manner of clamping may be avoided and the portion 66 acted on by the plug as hereafter described while held between jaws 40 and 42, or the sheet may be clamped directly against surface 46 without employing jaws 40 and 42.

Figure 2:
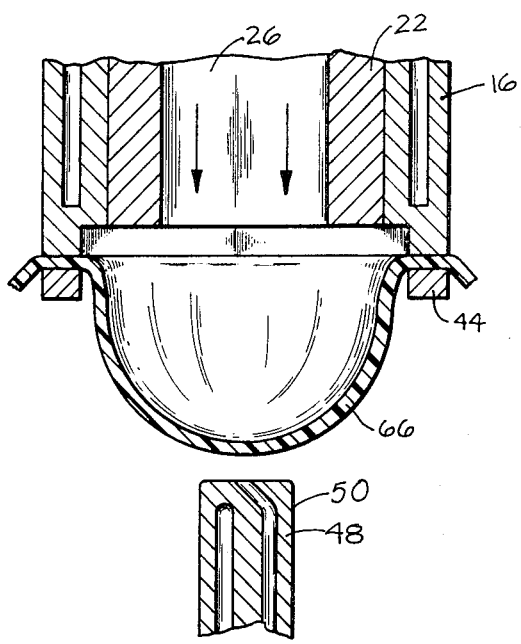

Pressurized fluid, such as air at a pressure of, for example, 2-15 p.s.i., is now introduced from a suitable source through passage 18, channels 24 and cavity 26 of the mold assembly 12 (FIG. 2) and against the side of sheet S facing mold assembly 12, thus serving to stretch portion 66 and cause it to billow in a direction away from the mouth of mold cavity 26. Such stretching action while within the preselected temperature described previously will thin and accordingly increase the surface area of portion 66 of sheet S, within the clamped and supported periphery. If the portion of sheet S within the clamped and/or supported periphery is considered to be circular in form prior to stretching, portion 66 after this stretching action will be in the form of a hemisphere which necessarily has an increased surface area over that existing previously. This surface area enlargement, which should represent an increase of from 150 to 300 percent of the initial surface area prior to stretching, can be considered to be characterized by a series of peripherally extending surface elements originating at the center of the hemisphere which originally were radii of the flat sheet. Also, as will be further explained hereafter, material defining the increased surface, though at this point in the process extending more in a radial direction with respect to the axis of the mold cavity or container, will, after the action of plug 48 extend generally in a direction along the axis of cavity 26. As an important part of the present invention, it should be noted that this initial stretching of the sheet away from the mouth of the die cavity while within the previously described temperature range is basically responsible for development of the molecular orientation in the axial direction in the finished container, since the sheet is at a temperature at which some, but not substantial orientation can be developed on stretching.

Figure 3:
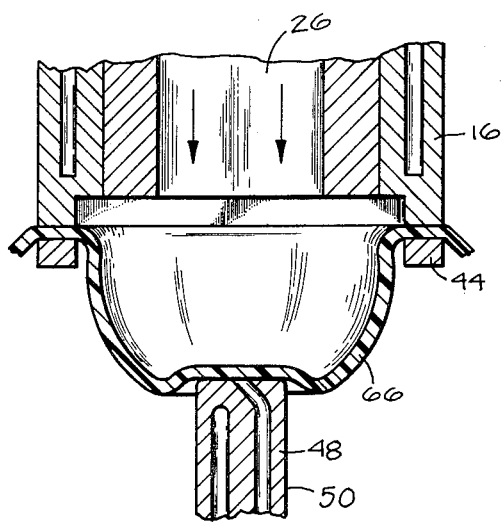
Figure 4:
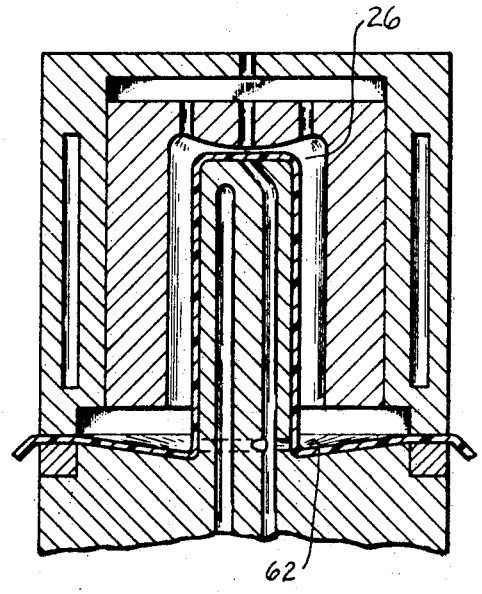

After the sheet has been thus billowed, plug 48 (FIGS. 3 and 4) is caused to rapidly advance into portion 66 to move it into cavity 26 preferably without contacting the cavity surface. Plug 48 and cavity 26 are so dimensioned with respect to each other that when the advancing movement of plug 48 is terminated, the sheet is still spaced from the opposing die walls (FIG. 4). Also (FIG. 4), the length of the plug measured from its top to its bottom end should always be equal to or greater than the length in the same direction of the container surface defining portion of cavity 26, or in other words, that portion forward of step 30. When this relationship is maintained, substantially no further orientation in the axial direction will occur during final forming of the container. Also, rim surface 28 and step surfaces 32 and 34, which together define a relieved increased surface area of the mold assembly rearward of cavity 26, serve to prevent any ripples from forming in the container during final expansion; these ripples would otherwise occur if the surface area of the base of the plug, as defined by the surface in FIG. 1 forming depression 62, was more than that of the surface area of the rearward end of the cavity adjacent the mouth, or, in other words, if the relief area were not provided in the cavity. Though movement of the sheet during this stage of the process is shown in the drawings as into a die cavity, it should be understood that such axial movement could be carried out independently of, or in other words outside of a surrounding mold and then the plug could be positioned within the cavity after impaling the sheet thereon, as will be further described hereafter.

As can be recognized, the molecular orientation extending in the radial direction with respect to the die or container axis which was developed in the previously described billow step is now transformed because of the action of the plug, into orientation extending to a major extent in the axial direction. Also, in view of the enlargement of the sheet surface area as a result of the stretching during billowing, the plug preferably does not stretch the sheet further to any substantial extent as it moves into the cavity, but rather becomes encased by the sheet as a result of the pressure in the cavity generated by the fluid which continues to issue from channels 24. However, depending on the depth and diameter of the article being formed and the amount of stretch developed in the sheet during billowing, additional axial orientation may be imparted by drawing or further stretching of the sheet through the action of the plug. Though it is preferred for purpose of minimizing cycle time that the plug be encased as it is advanced into the die cavity, it is possible to move the plug into the cavity in the absence of air emitting from the die and then to turn on the air after the plug is in position within the die to cause said encasing. In any event, it is important that the sheet portion acted upon by the plug, or that portion within the die cavity in FIG. 4, be forced into intimate contact with surface 50 of plug 48. This may be facilitated by imposing a reduced pressure on the side of sheet S facing plug 48 via branches 58 and passage 46 in plug 48 which, as mentioned, are connected through suitable valving to a source of reduced pressure or to the atmosphere.

As an essential part of the present process, the material contacting surface 50 which, in the drawings, is shown as the exterior of plug 48, but may be another means such as the surface of a conditioning cavity, is kept at a temperature which is within the range at which substantial molecular orientation of the thermoplastic occurs on stretching. This temperature is to be contrasted with the temperature of the sheet during billowing, the latter being such as to develop some but not a substantial amount of orientation on stretching. Accordingly, the plug surface temperature in the present process is always below the temperature of the sheet during billowing and above the glass transition temperature of the thermoplastic material (that temperature or narrow temperature range below which the polymer is in a glassy state). More specifically, it should be within the region where the modulus of the polymer changes rapidly with temperature, and on a plot of modulus versus temperature for the particular polymer in the region where the ratio of modulus to temperature is always greater than one (1). Such a temperature range is illustrated as that embraced by 74 in FIG. 6.

The temperature of surface 50 is controlled by temperature conditioning means associated, for example, with bore 54 of plug 48 and which is connected to a suitable on-off conventional control system. After plug 48 has been sheathed with the thermoplastic, it is essential that the sheet portion be held in contact with the plug surface until its temperature is reduced to within the just described range whereat substantial orientation occurs on stretching. Though this time interval will vary with the type and thickness of material being processed and the amount of orientation desired to be generated in the final container forming step to be hereafter described, for substantially amorphous orientable thermoplastics, this time interval will be within the range of from 5 to 60 seconds.

After the sheet portion within the die cavity has been reduced in temperature to that at which substantial orientation occurs on stretching, it is forced outwardly off the plug surface 50 into contact with the opposing walls of mold cavity 26 to substantially molecularly orient the thermoplastic in a circumferential direction, or in other words in the direction transverse to the axial direction. During this outward expansion of the material in moving from the plug to the cavity surface, the surface area of the sheet portion is usually increased from 25 to 200 percent of that existing when such portion is encasing the plug surface. This final expansion may be achieved by introducing a fluid at a pressure of about 15–80 p.s.i.g. against the sheet through passage 56 and one or more of branches 58. Such expansion against the walls of the die cavity, of course, serves also to finish form the container. Thus, with respect to the body of the container, the stretching of the sheet portion in moving from plug surface 50 to the die surface imparts substantial molecular orientation to the thermoplastic with little or no additional axial orientation, even though the distance (70 in FIG. 5) between the plug and cavity walls be relatively small, since the sheet is at a reduced temperature or in other words that at which substantial orientation occurs. After expansion against the cavity surface and setting of the thermoplastic, flash portion 68 (FIG. 5) is trimmed away from portion 66 by conventional techniques (not shown). The resulting container has a relatively balanced amount of molecular orientation therein, that in the axial direction being generated basically during the billowing step and that in the transverse direction being generated during the final article forming step. Obviously, by manipulating the temperatures of the sheet and the dimensions of the plug and cavity walls relative to each other, this balance may be varied as desired.

EXAMPLE

Figure 5:
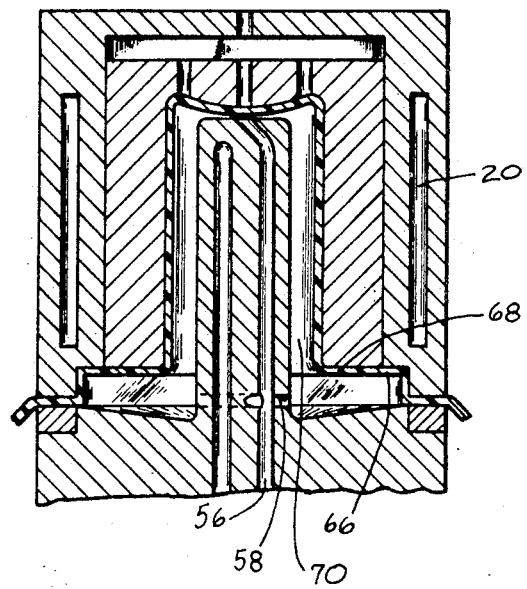

Cylindrical containers of the type depicted in FIG. 5 are formed from atactic polystyrene sheet having a number—average molecular weight $\overline{M}n$ of 217,000 by varying the plug holding time while in contact with the sheet utilizing a constant plug surface temperature of 100° C. and a constant sheet temperature of 130° C. during billowing, as described previously herein. The sheet is blown immediately off the plug surface on entering the mold as is standard practice in forming from sheet material in a first series of runs, whereas the sheet for the orientation balanced containers is equilibrated to the 100° C. plug surface temperature by a 30 sec. hold time prior to blowing to the mold cavity surface for another series of runs. Several containers from each of these series of runs are then subjected to a transversely directed compression or squeezability test in a force measuring and recording test device, model No. TM, manufactured by Instron Engineering Corp. Containers formed without sheet temperature conditioning prior to final blowing withstand only an average 7% diameter reduction, measured in the direction of the force, before breaking due to an inherent high ratio of axial to radial orientation. Containers subjected to the dual temperature forming conditions of the present invention tested in the same manner exceed an average 50% diameter reduction without breaking, and some reach as much as 70% diameter reduction prior to breaking, thus imparting a 7 to 10 fold improvement by means of the technique of the present invention, the containers in all runs being made from the same sheet gage. Also, the maximum load per unit of gauge thickness for conventionally formed containers averages about 177 lbs./in. whereas that for the orientation balanced containers averages 700 lbs./in. with some reaching as high as 800 lbs./in. or 4½ times the load bearing capability of those formed without sheet temperature conditioning.

Though the process of the present invention may be employed to some advantage in shaping all type of articles, it has particular application and is preferably used in deep draw forming processes where the amount of stretching of the sheet considered with respect to the axial direction is from 1 to 6 times the shortest crosswise dimension of the formed article.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. A method of forming a hollow thermoplastic article having relatively balanced molecular orientation wherein a relatively long stretch in the axial direction and a shorter stretch in the radial direction are required, which method comprises:

(a) supporting a sheet of substantially amorphous thermoplastic material about its periphery, said sheet being at a temperature within a range at which rubbery flow of the thermoplastic material can occur on stretching;
   (b) billowing said sheet relative to the supported periphery while within said temperature range to stretch and molecularly orient to a limited extent the portion of said sheet within the supported periphery;

(c) advancing a plug into said billowed sheet portion to intimately contact said stretched sheet portion and axially move it in a direction opposite to that occurring on billowing while said sheet portion is still within said temperature range;

(d) bringing said sheet portion to a temperature which is above the glass transition temperature and is within a range whereat the ratio of modulus to temperature is greater than 1 in a plot of modulus of the material versus temperature; and then (e) forcing said sheet portion while within said last mentioned temperature range outwardly into contact with the walls of a mold cavity to form the hollow article and substantially molecularly orient said material in the peripheral direction with respect to the axis of the article.

2. The process of claim 1 including the step of drawing a partial vacuum through said plug while said plug is in contact with said sheet portion to enhance said intimate contact between the plug and sheet portion.

3. The process of claim 1 including the step of clamping the portion of the sheet within its supported periphery to the surface of a mold prior to said billowing.

4. The process of claim 1 wherein the amount of stretching of said sheet portion considered with respect to the axial direction is between 1 to 6 times the shortest crosswise dimension of the formed article.

5. The process of claim 1 wherein said sheet portion is held in contact with a temperature controlled plug surface for between five to sixty seconds before being forced outwardly into contact with the walls of said mold cavity.

6. In a plug assist thermoforming process for forming a deep hollow article requiring a relatively long stretch in the axial direction and a shorter stretch in the radial direction from substantially amorphous thermoplastic material by expanding a portion of said thermoplastic outwardly off the plug against the surface of a mold cavity, the improvement which comprises forming the article with relatively balanced orientation by forcing said thermoplastic portion in an axial direction while at a temperature at which rubbery flow of the thermoplastic material occurs to minimize development of orientation in said axial direction while partially forming the article and then holding said portion in contact with a temperature conditioned surface prior to expanding said portion against the surface of the mold cavity to reduce the temperature of said material to within the range whereat the ratio of modulus to temperature is greater than 1 in a plot of modulus of the material versus temperature.

7. A method of forming a container having relatively balanced molecular orientation wherein a relatively long stretch in the axial direction and a shorter stretch in the radial direction are required, which method comprises:

(a) supporting a sheet of substantially amorphous thermoplastic material opposite the mouth of a mold having a cavity with a peripheral configuration conforming to that of said container, said sheet being at a temperature below the extrusion temperature of the material and within a range at which rubbery flow of the material occurs on stretching;

(b) clamping the sheet within its supported periphery against the surface of said mold adjacent said mouth such that a portion extends across said mouth;

(c) directing a pressurized fluid against the portion of said sheet extending across the mouth to stretch said sheet portion in a direction away from the mouth of the mold cavity and thereby impart a limited amount of molecular orientation to said sheet in a direction which will be along the axis of said container;

(d) rapidly advancing a plug into said stretched sheet against the portion extending across said mouth to move said portion into the cavity without contacting the cavity surface, said plug having a surface temperature which is below said prior mentioned range and is within a range equivalent to that of the material whereat the ratio of its modulus to temperature is greater than 1 in a plot of modulus of the material versus temperature;

(e) forcing said sheet portion into intimate contact with the surface of the plug by changing the differential pressure on either side of the sheet;

(f) holding said sheet portion within the cavity in contact with said plug surface until said sheet portion reaches a temperature which is substantially equivalent to that of said plug; and (g) forcing said sheet portion when at substantially the temperature of the plug outwardly from the plug surface into contact with the walls of said mold cavity to substantially molecularly orient said sheet portion in the circumferential direction while finish forming said container.

8. The method of claim 7 wherein said sheet portion is held in contact with the plug surface for between 5 to 60 seconds prior to being forced outwardly to form said article.

9. The method of claim 7 wherein said thermoplastic material is polystyrene.

References Cited

UNITED STATES PATENTS

| | | | |
|---|---|---|---|
| 2,917,783 | 12/1959 | Olson et al. | 264—92 XR |
| 2,973,558 | 3/1961 | Stratton, Jr. | 264—92 XR |
| 2,990,581 | 7/1961 | Rowe, Jr. | 264—89 |
| 3,311,684 | 3/1967 | Heider | 264—99 |
| 3,342,914 | 9/1967 | Edwards | 264—92 |
| 3,461,503 | 8/1969 | Dockery | 425—343 XR |
| 3,629,381 | 12/1971 | Walker | 264—92 |
| 3,244,779 | 4/1966 | Levey et al. | 264—291 XR |
| 3,244,780 | 4/1966 | Levey et al. | 264—291 XR |
| 3,060,507 | 10/1962 | Knowles. | |
| 3,115,677 | 12/1963 | Thiel. | |
| 3,218,379 | 11/1965 | Edwards. | |
| 3,283,045 | 11/1966 | Thiel. | |

JAN H. SILBAUGH, Primary Examiner

U.S. Cl. X.R.

264—92, 94, 327